United States Patent
Dickens et al.

[11] Patent Number: 5,844,212
[45] Date of Patent: Dec. 1, 1998

[54] DUAL SURFACE HEATERS

[75] Inventors: David M. Dickens, Sunnyvale; James B. Ross, Saratoga; Joel D. Finegan, Fremont, all of Calif.

[73] Assignee: Gas Research Institute, Chicago, Ill.

[21] Appl. No.: 664,917

[22] Filed: Jun. 18, 1996

Related U.S. Application Data

[63] Continuation-in-part of Ser. No. 365,485, Dec. 27, 1994, Pat. No. 5,528,020, which is a continuation of Ser. No. 78,165, Jun. 21, 1993 which is a continuation of PCT/US92/09154 Oct. 23, 1992, abandoned, which is a continuation-in-part of Ser. No. 780,977, Oct. 23, 1991, abandoned.

[51] Int. Cl.$^6$ ...................................................... H05B 6/12
[52] U.S. Cl. .......................... 219/621; 219/618; 219/624; 219/637
[58] Field of Search ..................................... 219/618, 620, 219/621, 624, 635, 636, 637, 643; 99/372, 376, 389; 156/64, 274.2

[56] References Cited

U.S. PATENT DOCUMENTS

| | | |
|---|---|---|
| 2,362,757 | 11/1944 | Lang . |
| 2,739,829 | 3/1956 | Pedlow et al. . |
| 3,038,055 | 6/1962 | Ross . |
| 3,307,007 | 2/1967 | Schroeder . |
| 3,353,849 | 11/1967 | Laurizio . |
| 3,761,668 | 9/1973 | Harnden, Jr. et al. . |
| 3,770,928 | 11/1973 | Kornrumf et al. . |
| 3,814,888 | 6/1974 | Bowers et al. . |
| 3,819,903 | 6/1974 | Frick . |
| 3,843,857 | 10/1974 | Cunningham . |
| 3,928,744 | 12/1975 | Hibino et al. . |
| 3,966,426 | 6/1976 | McCoy et al. . |
| 3,979,572 | 9/1976 | Ito et al. . |
| 4,008,118 | 2/1977 | Wesebaum et al. . |
| 4,256,945 | 3/1981 | Carter et al. . |
| 4,296,295 | 10/1981 | Kiuchi . |
| 4,453,067 | 6/1984 | Karklys et al. . |
| 4,629,843 | 12/1986 | Kato et al. . |
| 4,646,935 | 3/1987 | Ulam . |
| 4,669,373 | 6/1987 | Weimer et al. . |
| 4,695,335 | 9/1987 | Lyall . |
| 4,701,587 | 10/1987 | Carter et al. . |
| 4,763,571 | 8/1988 | Bergling et al. . |
| 4,792,374 | 12/1988 | Rianda . |
| 4,833,288 | 5/1989 | Poumey . |
| 4,852,914 | 8/1989 | Lyall . |
| 4,914,267 | 4/1990 | Derbyshire . |
| 5,107,095 | 4/1992 | Derbyshire . |
| 5,134,265 | 7/1992 | Dickens et al. . |
| 5,227,597 | 7/1993 | Dickens et al. . |

FOREIGN PATENT DOCUMENTS

| | | |
|---|---|---|
| 8002124 | 10/1980 | European Pat. Off. . |
| 0250094 | 12/1987 | European Pat. Off. . |
| 957148 | 1/1957 | Germany . |

OTHER PUBLICATIONS

R.B. Jablonski, "Inductive Heating of Fluids", IBM Technical Disclosure Bulletin, vol. 14, No. 10, Mar. 1972.

*Primary Examiner*—Tu Ba Hoang
*Attorney, Agent, or Firm*—Speckman Pauley Petersen & Fejer

[57] ABSTRACT

A dual plate heater provides two parallel temperature self-regulating heater plates or wire mesh comprising ferromagnetic material with one or more electrically energized coils parallel to and located between the heater plates which coil(s) when energized by a constant current or by an otherwise controlled current heat the plates to their Curie temperature or temperatures. The coil may be a flat spiral of thin conductive (copper) wire embedded in a thin layer of a heat conductive, electrically non-conductive material between said plates whereby heat energy generated in the coil is supplied to the heater plates. The dual plate heater may be employed to heat plastic pipes to their butt welding temperatures after which the heater is removed to the ends of the pipes to be joined are brought into contact under pressure. The dual plate heaters may also be employed in other arrangements such as shelves in a dispensing machine.

6 Claims, 6 Drawing Sheets

DUAL SURFACE HEATERS

This application is a continuation-in-part of application Ser. No. 08/365,485 filed on 27 Dec., 1994, now U.S. Pat. No. 5,528,020 which is a continuation of U.S. Ser. No. 08/078,165, filed 21 Jun., 1993, now abandoned, which is a 35 U.S.C. 371 application of PCT/US92/09154, filed 23 Oct. 1992, which is a continuation-in-part of Ser. No. 07/780,977, filed 23 Oct., 1991, now abandoned.

BACKGROUND OF THE INVENTION

The present invention relates to temperature self-regulating dual surface heaters and more particularly to a heater having opposed faces which may be self-regulated at the same or different temperatures for multi purposes including butt fusion of plastic pipe, shelf heater in vending machines and the like.

In butt fusion of plastic pipes, the ends of the pipes are individually heated to fusion temperature by cartridge heaters that heat up the entire housing and thus are quite inefficient. This problem becomes apparent when it is realized that the housing is large and made of aluminum and thus presents a substantial mass that must be heated. Also the device is quite heavy and difficult to use. Further the temperature distribution in such an arrangement is poor and long heat up and cool down times are encountered.

In the field of vending machines, food to be heated is taken from the machine and heated in a microwave or other oven. When the food, such as soup is in a metal can and a microwave oven used, the food must be removed from the metal container and placed in a non-metallic dish for heating. At lunch time lines often form at the microwave as individuals await the opportunity to heat their food.

OBJECTS OF THE PRESENT INVENTION

It is an object of the present invention to provide a dual surface heater which utilizes a pancake induction coil or two independently energized pancake induction coils to heat two parallel ferromagnetic members to their Curie temperatures.

It is yet another object of the present invention to provide a structure for heating two parallel plates which structure is light weight, relatively small and easily physically managed.

It is still another object of the present invention to provide a dual plate heater wherein each plate or set of plates may be easily changed to provide a different temperature plate or plates.

Another object of the present invention is to provide a dual plate heater that provides significant heat only to those areas of each plate that has a heat load.

It is still another object of the present invention to provide a dual plate heater that is heated by induction coupling from one, two or more electric coils.

Yet another object of the present invention is to provide a dual plate heater for use in butt welding plastic pipes wherein the heat-up and cool-down times relative to conventional heaters used for such purposes require considerably less time, due in large part to the fact that little heat is transmitted to a supporting structure.

Still another object of the present invention is to provide a dual plate heater for use as warming or cooking shelves in a vending machine.

BRIEF DESCRIPTION OF THE PRESENT INVENTION

The present invention comprises preferably two generally parallel ferromagnetic plates having Curie temperatures that may or may not be the same but each of which is selected in accordance with the temperature to which their respective loads are to be heated and at least one preferably pancake coil parallel to and located between the plates whereby when the coil is energized by an electric current at high frequency the plates are heated to approximately their Curie temperatures.

The heater may be employed in butt welding of plastic pipes by energizing the heater until the plates obtain their Curie temperature, then bringing the ends of the pipes to be joined into contact with the plates removing the heater and bringing the ends to be joined into contact with one another under appropriate axial pressure whereby to affect a weld.

Various forms of coil structure and coil heater plate structures are disclosed herein. In one form round wires are buried in a heat and electrically insulating material and the heater plates are disposed on either side of the insulation. It has been found that the thermal insulation traps heat and the result is that the temperature of the coil may rise well above the plate temperature resulting in short coil life unless the total operation is completed quite rapidly before the coil reaches very high temperatures. If rapid heating which is not always possible, is not provided, the final temperature of the coil is always the same for a given power. It may take longer to get there but in the long run it does. Cooling may be used to control the temperature of the coil.

In preferred embodiment of the invention, a flat body of thermally conductive material is placed between the heater plate and coil to provide a good thermal path between the coil and plate. Heat of the plate is passed to the load and to the extent the temperature of the coil rises above the temperature of the plate, heat energy is passed from the coil to the plate through the thermally conductive material In a practical case the temperature required to produce fusion of the ends of plastic pipe might be 500° F. to 600° F. Copper, for instance, can withstand such temperatures. Thus by placing the coil in close thermal and physical proximity to the plate magnetic flux transfer is enhanced and quite importantly the heat energy of the coil ($I^2R$ losses) is transferred to the plate or plates when the coil temperature rises above the plate temperature. The coil should be designed to minimize heat energy but to the extent heat is generated it is used by the configuration described to heat the plates. It is found that a flat wound coil generates less heat than an edge wound coil and the temperature of the coil is maintained at an acceptable temperature above the plate temperatures.

An optimum coil at the present time has been found to be made of a high conductivity copper, for instance, an alloy of 110 copper of rectangular cross section, 0.3 inch wide and 0.062 inch thick. The coil is wound as a flat spiral with 7¾ turns and a spacing of approximately 0.1 inch between turns. The coil is currently used with a heater plate about ⅛ in thickness with 15 mils of Alloy 42-6 on both surfaces of an Aluminum Alloy 1100 plate. The plate and coil diameters are about the same, the coil diameter being approximately 8.4 inches with a pitch of about 0.4 inch.

Electrically insulating heat conductive potting compound must be used between the coil and the plate otherwise the coil would be short-circuited by the compound. The material, however, is maintained quite thin, about 0.15 inch for instance, and must present very good heat transfer properties. One such material has a magnesium oxide base and is sold by Coatronics Corporation under the designation Type 906. This material has a thermal conductivity of 40 BTU in/hour°F.

The dual plate heater may be employed for instance as cooking or warming shelves in a vending machine wherein products to be heated and then dispensed are sandwiched between a plate of each of the shelves above and below the product. Upon a request for a product the plates or more particularly one area of the plates are heated for a predetermined time and then terminating heating and dispensing the product.

In a further embodiment of the invention, ferromagnetic material in the form of a wire mesh may be employed so that the heater may be made into many different shapes, for instance curved for joining a saddle valve to a pipe. The wires may be heated by alternating current flow therethrough or by induction.

One or two coils may be used. When the coil or coils may be used with two plates having different Curie temperatures which may be required where that which is to be heated by each plate requires heating to a different temperature.

When the term "Curie temperature" is used herein it refers to the temperature at which the plates have lost sufficient ferromagnetism that heating is reduced such that cooling sets in. This phenomena may be detected in several well-known ways and may occur at 1° C. to 100° C. below absolute Curie temperature depending upon the ferromagnetic material used.

The term "ferromagnetic material" is used herein to include conductive ferromagnetic materials, ferrimagnetic materials, ferrites and other materials that lose a great percentage of their magnetic permeability at a given temperature.

Termination of significant heating occurs as a result of use of a constant current power supply. Power is $p=I^2R$. If current is constant then $I^2=K$ and $P=KR$. When Curie temperature is approached, magnetic flux coupling to the plates is greatly reduced, losses in the plates due to eddy currents and hysteresis are reduced and the temperature falls until the material again becomes significantly ferromagnetic and heating resumes. In this regard reference is made to U.S. Pat. No. 4,256,945. Other methods of controlling heating as a function of Curie temperature are disclosed in U.S. Pat. Nos. Re. 33,644 and 4,795,886, the latter patent disclosing a preferable method of Curie temperature control for the device of the present invention. The disclosure of this latter patent is incorporated herein by reference.

DETAILED DESCRIPTION OF THE PRESENT INVENTION

Figure 1:
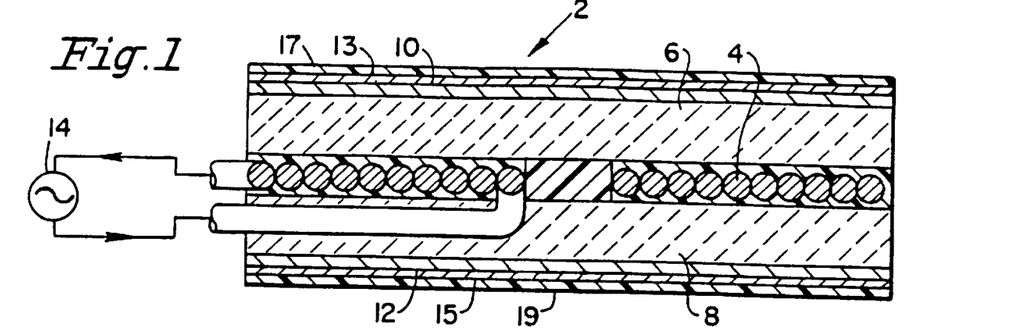
FIG. 1 is a side view in cross section of a basic embodiment of the present invention.

Referring to FIG. 1 of the accompanying drawings there is illustrated the simplest form of the basic components of the present invention. The heater 2 includes a pancake coil 4 made of Litz wire, conductive tubing or the like located between plates 6 and 8 of refractory material. In the illustrated embodiment, the coil is encapsulated in epoxy type material or foam or other similar insulating material for various purposes such as insulation, spacing of coil from plates and as a material for holding the coil in position. Heater plates, specifically plates 10 and 12 of ferromagnetic material are disposed in contact with the refractory materials 6 and 8, respectively, to complete the simplest basic structure. Teflon coatings 17 and 19 to prevent sticking may be applied to the surfaces of the plates 10 and 12 respectively. Also a good heat conductive metal such as copper or aluminum 13 and 15 may be disposed between the plates 10 and 12 and the Teflon coatings. If conductive tubing is employed for the coil material, it may be hollow and may therefore be water or air cooled or the like.

Figure 2:
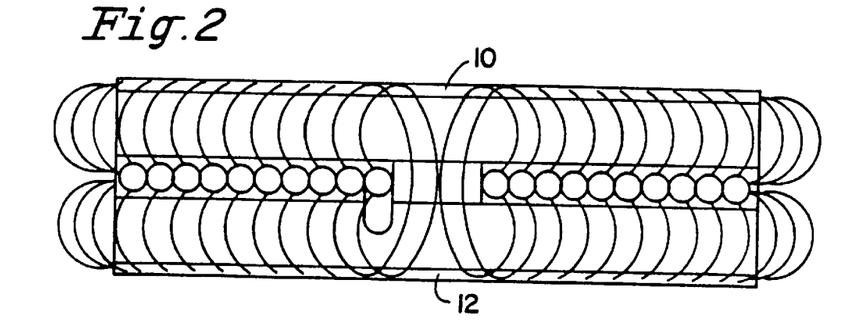
FIG. 2 illustrates the magnetic flux coupling from the coil to the heater plates.
Figure 3A:
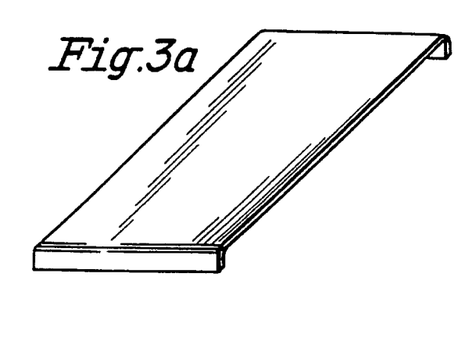
FIGS. 3a–f illustrate various configurations of heater plates.
Figure 3B:
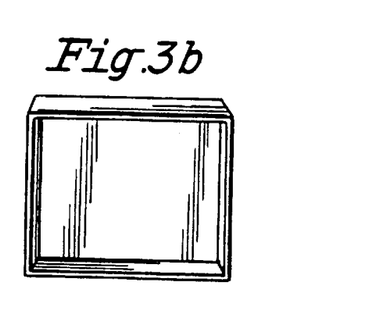
Figure 3C:
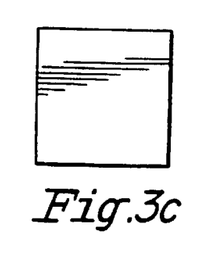
Figure 3D:
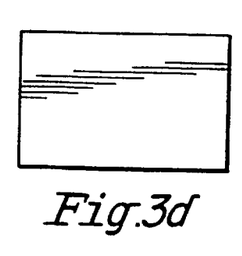
Figure 3E:
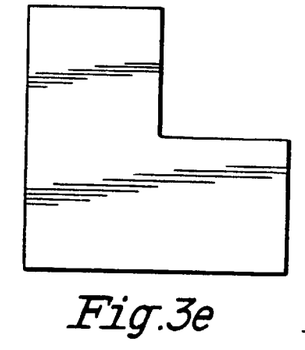
Figure 3F:
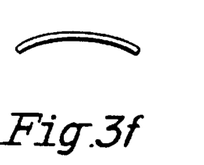

Upon connection of the coil 4 to a high frequency source such as disclosed in U.S. Pat. No. Re. 33,644 or U.S. Pat. No. 4,795,886 or a constant current source, any one of which is represented by the source 14. R.F. power source 14 produces an alternating discontinuous or continuous electromagnetic field, see FIG. 2, that links the plates 10 and 12 producing eddy current and hysteresis losses in the plates to produce heating therein. Upon reaching their Curie temperatures, the coupling of energy into the plates 10 and 12 is greatly reduced and the plates dissipate heat more quickly than heat is generated, the plates cool until they again become effectively ferromagnetic and heating is increased to a level above the rate of heat dissipation. This action is substantially instantaneous and causes a constant temperature condition.

The plates 10 and 12 may take any desired shape, round, C-shaped, rectangular, cup shaped, L-shaped, etc., a specific shape being tailored to the contemplated use of the heater. See FIGS. 3a–f.

Figure 4:
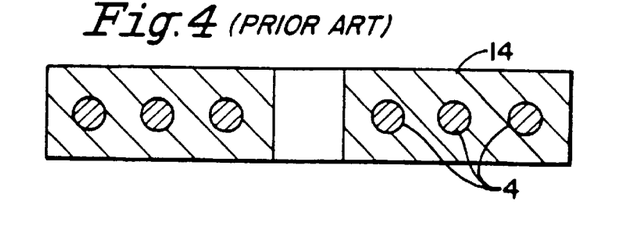
FIG. 4 is a view in cross section of a prior art heater structure.

Referring to FIG. 4 of the accompanying drawings there is illustrated a prior art heater wherein the coil 4 is embedded in a ceramic or cast material (such as aluminum) housing 14 to provide rigidity to the structure. In the preferred embodiment of the prior art Calrod heater units are employed.

A primary advantage to a dual layer coil or of layers of two separate coils connected in series but preferably connected in parallel is in the use of heater plates of different Curie temperatures. A single layer coil may be used in such a situation but some interaction between the Curie temperature of the plates is inevitable since when one plate reaches Curie temperature the magnetic flux is coupled primarily into the other plate and temperature control may be affected.

With the use of a multilayer coil particularly with insulation between the layers some decoupling is achieved. If ferrite material is used between the layers of the coil additional decoupling is achieved and temperature control of the higher Curie temperature plate is improved. The use of two separate coils connected in series further enhances performance but the best results are achieved with two coils connected in parallel with a ferrite material disposed between the coils. In such a situation particularly where the power supply is not overloaded by the concurrent load on the two coils virtually complete isolation of the two loads is achieved.

The aforesaid discussion applies also to situations where the Curie temperatures of the two plates are the same but the heat loads are materially different. In such a situation one plate reaches Curie temperature before the other and it is desirable to avoid plate interaction.

Figure 5:
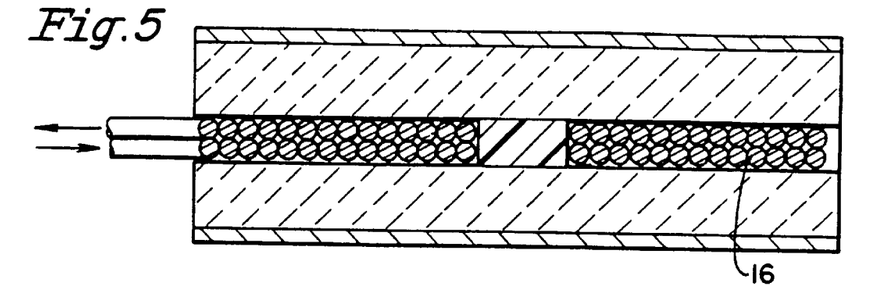
FIG. 5 is a view in cross section of a dual layer coil embodiment of the invention.

Referring to FIG. 5 coil 16 in this configuration is wound as a double layer for the reasons stated above and to provide additional energy to the heater, specifically to provide a greater concentration of flux to the plates.

Figure 6:
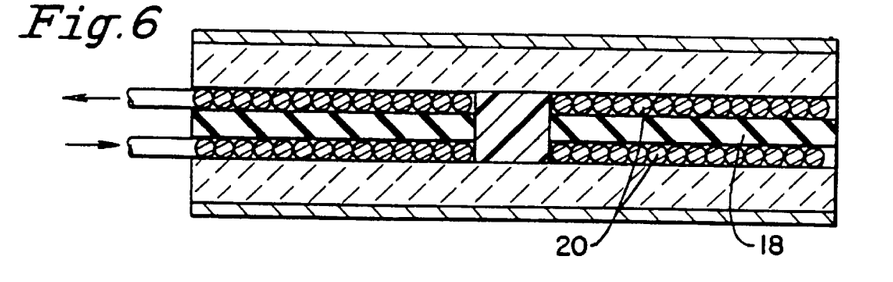
FIG. 6 is a view in cross section of a two layer coil wherein the two layers are separated by a layer of insulation.

In FIG. 6 an insulator 18 is disposed between the two coils 20 again to provide some decoupling between the coils. The insulation 18 of FIG. 6 reduces the cross coupling of the magnetic flux of the coils and the structure is more efficient than the structure of FIG. 5. In the structure of FIG. 5 the proximity of the two coils to one another produces a magnetic field canceling effect that renders the structure of FIG. 6 more efficient.

The coil may be wound as two distinct coils connected either in parallel or series with the parallel construction providing greater energy to the system than the series arrangement as well as providing additional decoupling. As indicated above, the parallel arrangement is particularly useful where the two plates have different Curie temperatures. Under such an arrangement if a single coil or two series connected coils, there is some interaction between the coils or effect of one on the other with a single coil resulting in poorer temperature regulation than with parallel connected coils. The single or series coil arrangement in these circumstances is satisfactory; the parallel connected coil arrangement is better.

Figure 7:
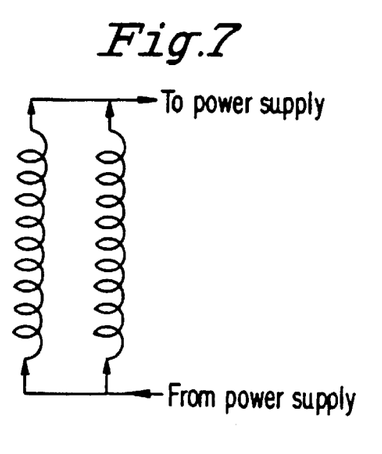
FIG. 7 is a circuit diagram of a parallel connection of two separate coils, one for each plate.
Figure 8:
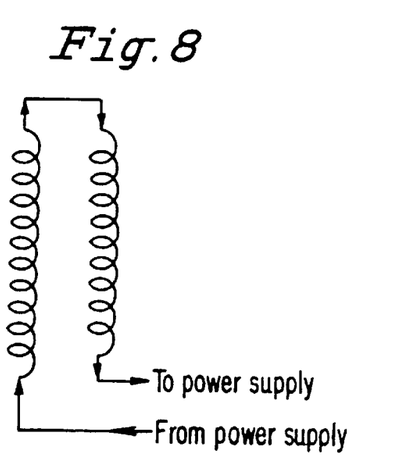
FIG. 8 is a circuit diagram of two separate coils, one for each plate, connected in series.

The circuit diagram for the parallel arrangement is illustrated in FIG. 7 and the circuit diagram for the series arrangement is illustrated in FIG. 8.

Figure 9:
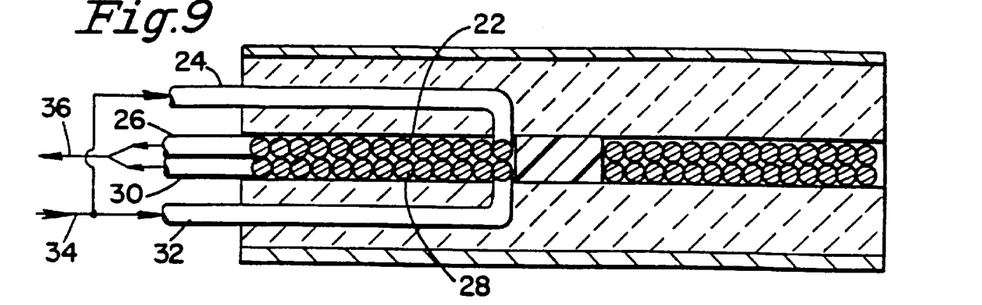
FIG. 9 is a cross-sectional view of an embodiment employing two coils connected in parallel.

The structure of dual layer coils connected in parallel is illustrated in FIG. 9 with a first coil 22 connected between leads 24 and 26 and a second coil 28 connected across leads 30 and 32. Leads 24 and 32 are connected to source lead 34 while leads 26 and 30 are connected to source lead 36.

Figure 10:
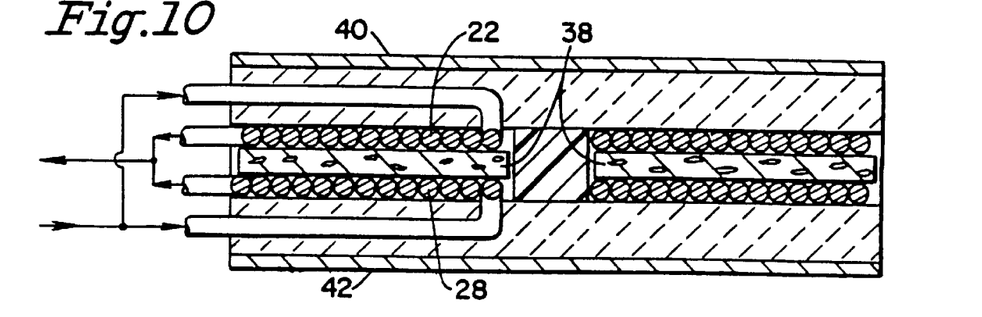
FIG. 10 is a cross-sectional view of two coils connected in parallel with the coils separated by a layer of ferrite material.

Referring to FIG. 10 of the drawings the structure is basically the same as in FIG. 9 except that a ferrite plate 38 is disposed between coils 22 and 28 to produce a greater concentration of the magnetic flux in heater plates 40 and 42 than is achieved with the use of the plate. With the ferrite the flux from a coil is reasonably isolated from the coil on the other side of the ferrite, this arrangement producing the best isolation of coils and plates of any of the embodiments.

Figure 11:
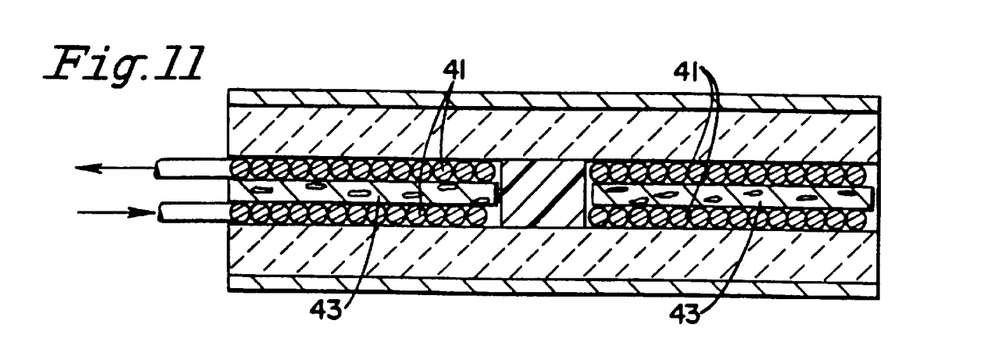
FIG. 11 is a cross-sectional view of a single two layer coil with the two layers separated by a ferrite material.

Referring to FIG. 11 a two layer single coil 40 has the layers separated by a layer of ferrite 42.

Figure 12:
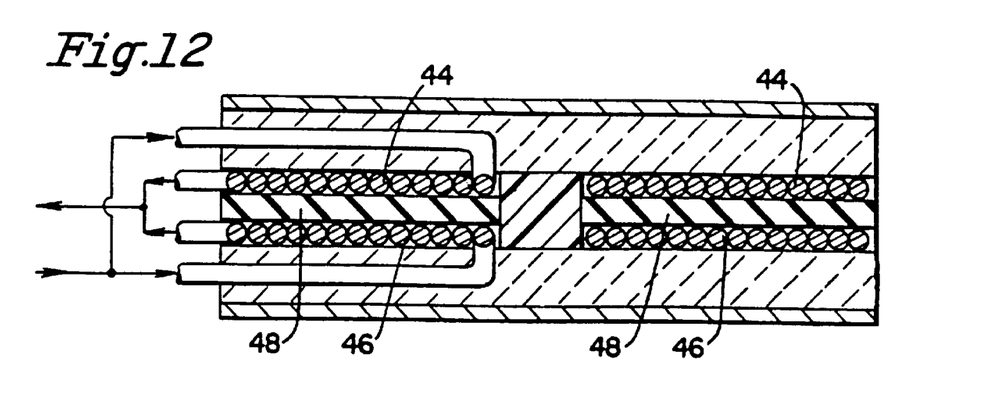
FIG. 12 is a cross-sectional view of two coils connected in parallel and separated by a layer of insulation.

FIG. 12 discloses dual coils 44 and 46 connected in parallel and separated by a layer of insulation 48.

Figure 13:
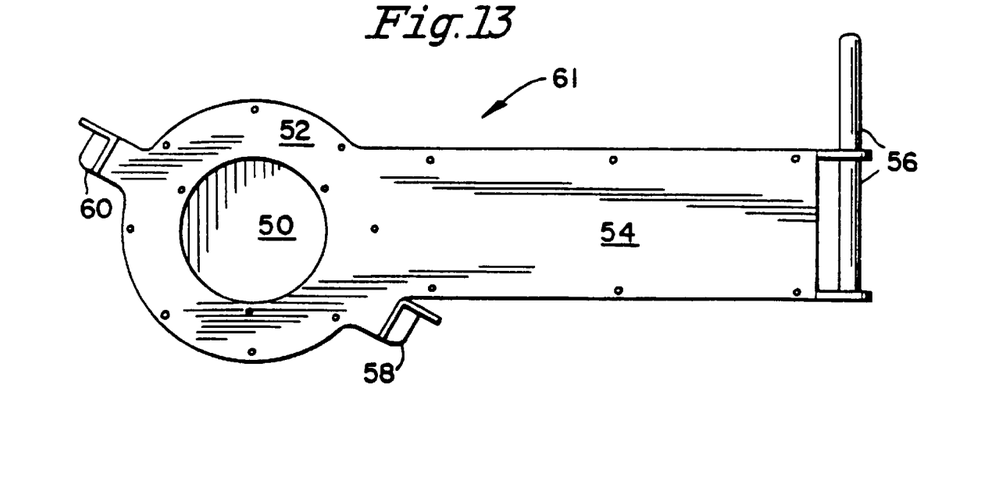
FIG. 13 is a view in elevation of a practical tool embodying the heater of the present invention.

FIG. 13 illustrates a practical embodiment of the present invention. The device 61 comprises a dual plate heater 50 attached to a housing 52. The housing 52 has a long arm 54 terminating in a handle 56. The housing may have oppositely disposed angle plates 58 and 60 for support on a structure employed in heating of pipes to be fused. The surfaces of the angle plates 58 and 60 may be covered with thermal insulation to reduce transfer of heat to adjacent members.

Figure 14:
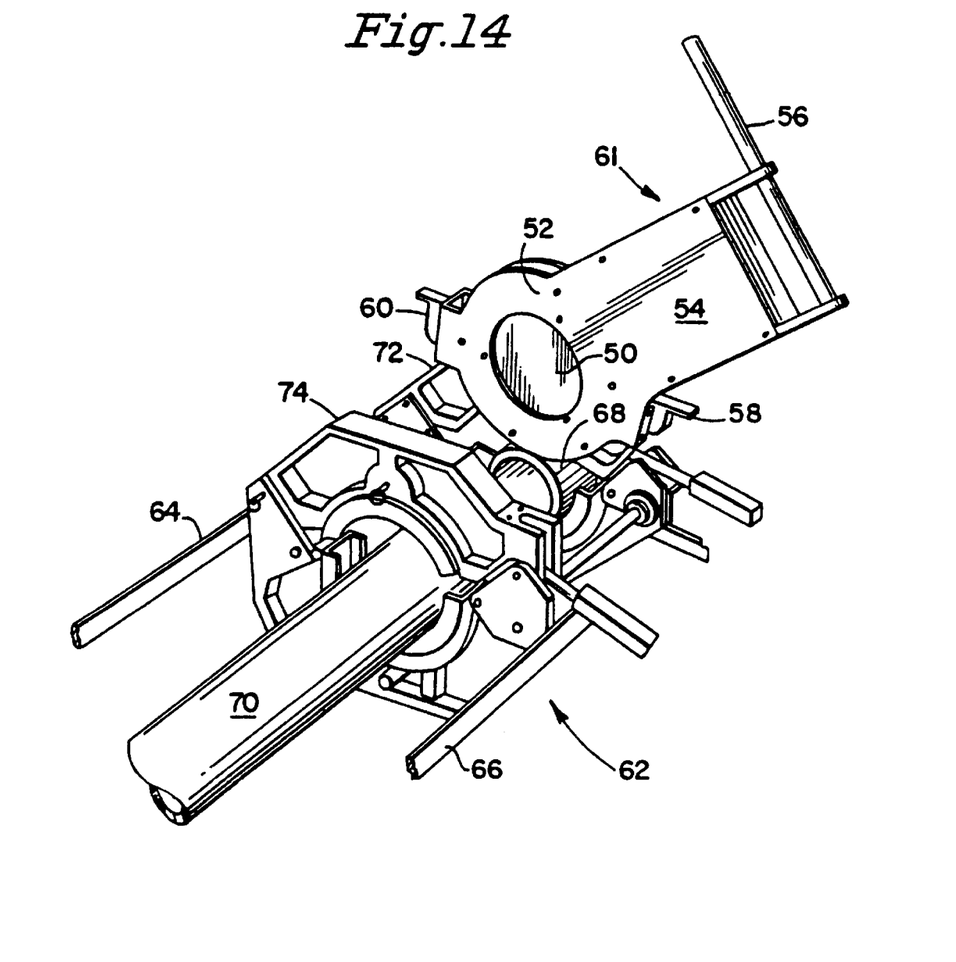
FIG. 14 illustrates the use of the tool of FIG. 13 to heat the ends of two plastic pipes to be butt welded.

Device 61, such as referred to in the description of FIG. 13, is illustrated in FIG. 14. The total structure 62 comprises a pair of parallel rails 64 and 66 spaced apart by the distance between the angle irons 58 and 60 of FIG. 13. Using the handle 56 to manipulate the apparatus of FIG. 13, it is laid between the rails with the angle irons 58 and 60 resting on the rails 64 and 66 respectively. The heater plates are heated to Curie temperature by energization of the coil or coils and pipes 68 and 70 which are to be butt welded are brought into contact with the two plates of the dual plate heater. When the two plates have achieved Curie temperature the pipes are brought into contact with the plates, heated to fusion temperature, the device 61 is removed and the heated ends of the pipe are brought into contact with one another and held together under pressure until welded.

To assist in properly aligning the pipes with the heater plates and subsequently with one another, hollow cylindrical tubes may be provided suspended between the rails 64 and 66. These tubes 72 and 74 are illustrated with dashed lines so as not to obscure the other parts of the apparatus. The separation between the tubes is only great enough to permit the dual plate heater to be inserted between them.

Figure 15:
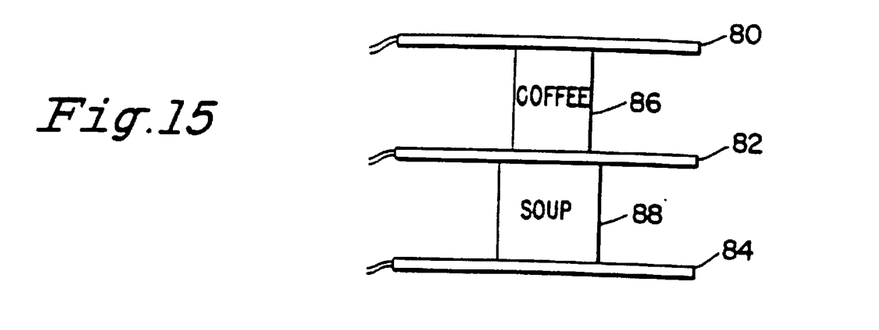
FIG. 15 illustrates an apparatus using dual plate heaters as shelves.

Referring to FIG. 15 of the accompanying drawings, there is illustrated a depiction of an arrangement wherein a product to be heated is disposed between the shelves of a container. Shelves 80, 82 and 84 are each a dual plate heater. A load 86 to be heated is disposed between shelves 80 and 82 and a heat load 88 is dispersed between shelves 82 and 84.

Each shelf is a dual plate heater which may be of any type illustrated in FIGS. 1, 4–12 with the bottom of shelf 80 and the top of shelf 82 having preferably the same Curie temperature. Correspondingly the bottom of shelf 82 and top of shelf 84 should preferably have the same Curie temperature.

When a product is to be heated the plates in contact with the desired product are energized. The shelves may have a heating zone in one location so that the article to be heated is brought to that zone when it is to be heated prior to dispensing or use. Alternatively the shelves may be ferromagnetic but have a plurality of heat zones defined by individual coils each of which is connected to a source of power as the shelf is rotated to a dispensing position if such is the case.

Figure 16:
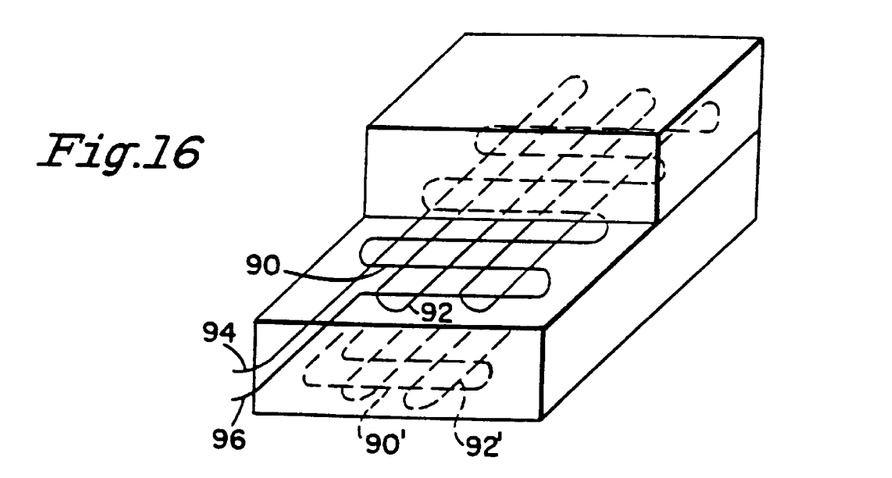
FIG. 16 illustrates a heater employing a wire mesh as the heater rather than a rigid plate.

Referring to FIG. 16 of the accompanying drawings, there is illustrated a heater employing a mesh of ferromagnetic material embedded in a strong non-magnetic, heat conductive plastic such as carbon fiber, liquid crystal material or the like. The advantages to such a structure is two fold; the wire mesh may serve as the heater as well as the ferromagnetic member and the heater is relatively flexible. It can be made in virtually any shape and is readily useable for fusing saddle valves to plastic pipes and other structures of non-planar or irregular shapes.

The basic concept of such a heater is illustrated in FIG. 16 and includes ferromagnetic cross wires 90 and longitudinal ferromagnetic wires 92. The wires are interwoven and the mesh may be made up of a continuous wire heated by passing a current via leads 94 and 96 as previously described. The wires may be of a conductive material coated with ferromagnetic material to improve Curie temperature control. Two such members are employed, one for each of the two heater surfaces; the second member being comprised of wires 90' and 92'.

In the alternative the wires may be heated by a high frequency magnetic field in which case the wire need not be insulated from one another. The coil structure of any one of FIGS. 1, 2 and 5 through 11 may be employed. Such an arrangement is illustrated in FIG. 17 hereof.

Figure 17:
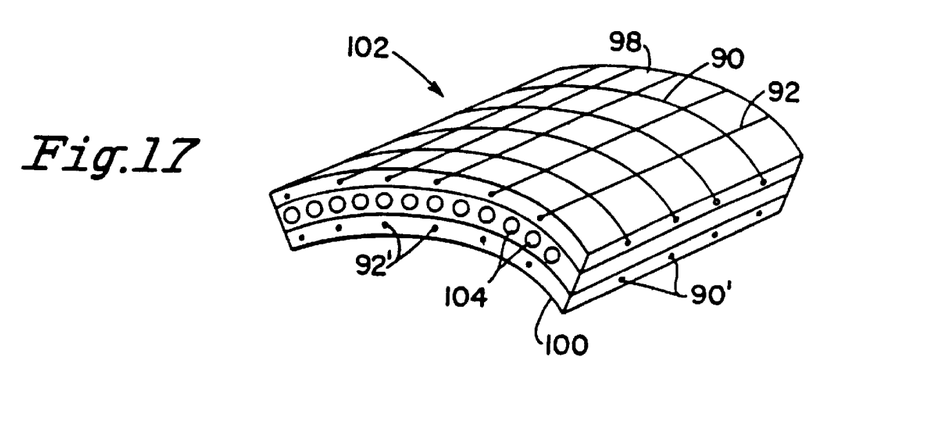
FIG. 17 illustrates a modification of the heater of FIG. 16.

Referring to FIG. 17, wires 90 and 90' are disposed adjacent surfaces 98 and 100 of a member 102 that also houses coil 104. The coil is embedded in a non-heat conductive plastic so as not to hinder the response of the meshes to Curie point control.

Figure 18:
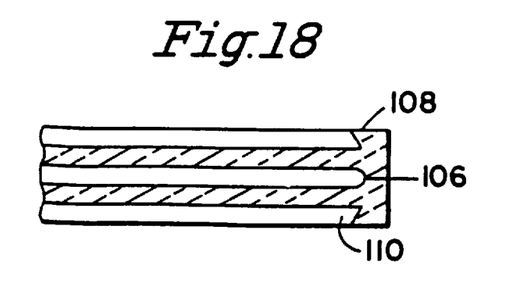
FIG. 18 illustrates a sandwich of a heater coil and heater plates according to the preferred embodiment of the present invention.
Figure 19:
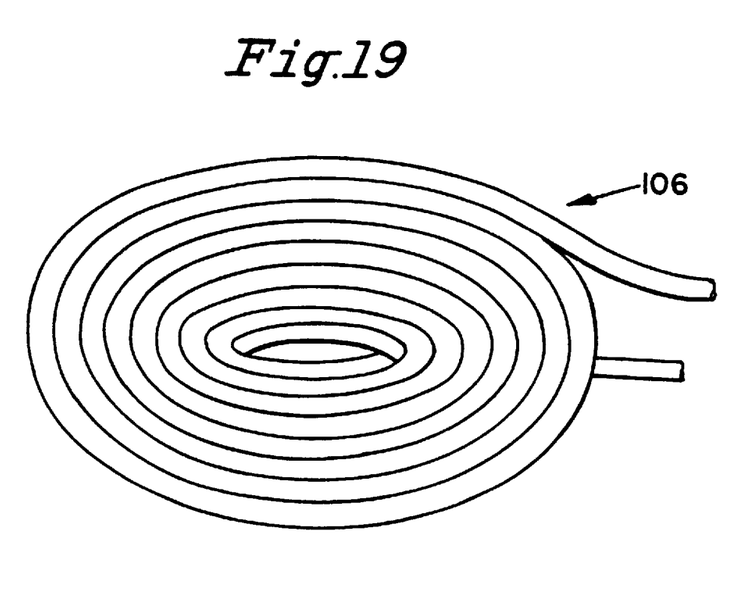
FIG. 19 illustrates a coil that may be used in the embodiment of FIG. 18.

Referring now specifically to FIGS. 18 and 19, there is illustrated various views of a preferred embodiment of the present invention.

In this embodiment of the invention preferably a single heater coil 106 is sandwiched between two heater plates 108 and 110. A layer of thermally conductive electrically insulating potting material 112 is disposed between the coil and each of the plates. In a commercial unit the ends of the elements are also covered with the material 112 to provide mechanical strength.

The coil is in the form of a flat spiral (FIG. 19) of preferably 7¾ turns for an 8.4 inch unit. The turns as previously indicated are wound from 110 copper strip 0.3× 0.062 inch and spaced about 0.10 inch apart. The performance of a combination of the coil and one plate is set forth in Table I below.

TABLE I

| Time (Min.) | Temp. °F. (Plate) | Temp. °F. (Coil) |
| --- | --- | --- |
| 0.00 | 78 | 78 |
| 3.25 |  | 427 |
| 3.50 | 489 |  |
| 3.75 |  | 459 |
| 4.00 | 492 |  |
| 4.25 |  | 480 |
| 4.50 | 493 |  |
| 4.75 |  | 495 |
| 5.00 | 492 |  |
| 5.25 |  | 507 |
| 5.50 | 490 |  |
| 5.75 |  | 516 |
| 6.00 | 489 |  |
| 6.25 |  | 520 |
| 6.50 | 490 |  |
| 6.75 |  | 525 |
| 7.00 | 489 |  |
| 7.25 |  | 528 |
| 7.50 | 490 |  |
| 7.75 |  | 530 |
| 8.00 | 490 |  |
| 8.25 |  | 532 |
| 8.50 | 489 |  |
| 8.75 |  | 533 |
| 9.00 | 490 |  |
| 9.25 |  | 533 |
| 9.75–25.00 | 489–490 | 535–536 |

It is to be noted that initially the coil and plate are at the same temperature. As current is fed to the coil the plate heats more rapidly as a result of the effect of the magnetic flux on the ferromagnetic plate. After some time period, 5.5 minutes in the present case, the temperature of the plate is autoregulating at between approximately 489° to 490° F. while at 4.5 minutes the coil temperature exceeds that of the plate. Since heat dissipation is more rapid from the exposed and loaded plates than from the buried coil. Coil temperature, in this instance, stabilizes at about 535° F. well below the temperature the coil wire can withstand. Thus it is seen that by employing a thermally conductive potting compound the coil temperature exceeds the plate temperature, pumps heat to the plate and thence to the load and stabilizes at quite acceptable levels.

Referring to Table II, the cool down times of the heater plate and coil are listed.

TABLE II

| Time (Min.) | Temp. °F. (Plate) | Temp. °F. (Coil) |
| --- | --- | --- |
| 0.00 | 489 |  |
| 0.25 |  | 535 |
| 0.50 | 470 |  |
| 0.75 |  | 525 |
| 1.00 | 453 |  |
| 1.25 |  | 513 |
| 1.50 | 438 |  |
| 1.75 |  | 504 |
| 2.00 | 424 |  |
| 2.25 |  | 492 |
| 2.50 | 412 |  |
| 2.75 |  | 480 |
| 3.00 | 401 |  |
| 3.25 |  | 469 |
| 3.50 | 389 |  |
| 3.75 |  | 459 |
| 4.00 | 380 |  |

Again as a result of the potting the coil cools at a lesser rate than the plate. The figures for this table were derived using a 9 turn coil but the extra 1.25 turns were located in the center of the coil and therefore had little effect on the results.

The coil may be fabricated by laser etching or preferably, to reduce cost, by winding a wire of a desired cross section as previously indicated. In this latter approach the wire to be wound and a spacer wire are clamped in a starter tool and the wires are wound about the tool. After winding the spacer wire is removed.

It has been found that a spacer wire of a constant width or diameter is not suitable since the outer turns of the spiral tend to open up more than the inner turns. To achieve a uniform 0.10 inch spacing between turns, a wire of 0.068 inch is used on the innermost turns but is too large for the outer turns. A wire 28 inches long and 0.068 inch diameter was used for the inner turns and a 50 inch long wire of 0.053 inch diameter was used beyond the 0.068 inch wire. It may be that the following is preferred: 28 inches of 0.068 inch wire followed by 28 inches of 0.053 inch wire followed by 0.040 inch wire leaving the last two or three turns without a spacer wire. The innermost radius of the coil is approximately 0.832 inch.

Once given the disclosure, many other features, modifications and improvements will become apparent to the skilled artisan. Such other modifications, features and improvements are, therefore, considered a part of this invention, the scope of which is to be determined by the following claims.

We claim:

1. A dual surface heater comprising
a first flexible wire structure of ferromagnetic material, a second flexible wire structure of ferromagnetic material, a structure of non-magnetic material, said wire structures being supported in said structure of non-magnetic material to provide separate heat sources to generally opposed surfaces of said non-magnetic structure, and means for connecting said wire structures to at least one source of current to produce a flow of current through said structures to heat the structures to a temperature at least approaching their Curie temperatures.

2. A dual surface heater according to claim 1 wherein said non-magnetic material is heat conductive.

3. A dual surface heater according to claim 1 wherein said non-magnetic material is non-heat conductive.

4. A dual surface heater comprising a first flexible wire structure of ferromagnetic material, a second flexible wire structure of ferromagnetic material, a structure of non-magnetic material, said wire structures being supported in said structure of non-magnetic material to provide separate heat sources to generally opposed surfaces of said non-magnetic structure, and means for heating said wire structures their Curie temperatures, said means for heating producing an alternating magnetic flux linking said flexible wire structures.

5. A dual surface heater according to claim 4 wherein said non-magnetic material is heat conductive.

6. A dual surface heater according to claim 4 wherein said non-magnetic material is non-heat conductive.

* * * * *